United States Patent
Wang et al.

(10) Patent No.: US 10,353,672 B2
(45) Date of Patent: Jul. 16, 2019

(54) METHODS AND APPARATUSES FOR COMPUTING TRIGONOMETRIC FUNCTIONS WITH HIGH PRECISION

(71) Applicant: VIA Alliance Semiconductor Co., Ltd., Shanghai (CN)

(72) Inventors: Wei Wang, Shanghai (CN); Xinan Jiang, Shanghai (CN); Chengxin Yin, Shanghai (CN); Huaisheng Zhang, Shanghai (CN); Tian Shen, Shanghai (CN); Bing Yu, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 123 days.

(21) Appl. No.: 14/883,889

(22) Filed: Oct. 15, 2015

(65) Prior Publication Data

US 2017/0090871 A1 Mar. 30, 2017

(30) Foreign Application Priority Data

Sep. 25, 2015 (CN) .......................... 2015 1 0621326

(51) Int. Cl.
*G06F 7/548* (2006.01)
(52) U.S. Cl.
CPC .................... *G06F 7/548* (2013.01)
(58) Field of Classification Search
CPC . G06F 7/544; G06F 7/548; G06F 1/03; G06F 2101/04
USPC ........................................................ 708/440
See application file for complete search history.

(56) References Cited

U.S. PATENT DOCUMENTS 6,640,237 B1   10/2003   Genrich
8,190,669 B1 *  5/2012   Oberman .............. G06F 7/5443
                                                        708/230

FOREIGN PATENT DOCUMENTS

CN             102262525           11/2011

OTHER PUBLICATIONS

Whitepaper-NVIDIA's Next Generation CUDA Compute Architecture, Fermi, 2009, NVIDIA Corporation, p. 7-11.*
Payne Hanek algorithm implementation in C, http://stackoverflow.com/questions/30463616/payne-hanek-algorithm-implementation-in-c, May 24, 2015.*
Claude-Pierre Jeannerod, et al, Simultaneous Floating-Point Sine and Cosine for VLIW Integer Processors, 2012, IEEE 23rd Inernational Conference on Application-Specific Systems, Architectures and Processors, p. 71-73.*

(Continued)

*Primary Examiner* — Andrew Caldwell
*Assistant Examiner* — Emily E Larocque
(74) *Attorney, Agent, or Firm* — McClure, Qualey & Rodack, LLP

(57) ABSTRACT

A method for computing trigonometric functions, performed by an ALU (Arithmetic Logic Unit) in coordination with an SFU (Special Function Unit), is introduced to contain at least the following steps. The ALU computes a remainder r and a reduction value x* corresponding to an input parameter x. The SFU computes an intermediate function f(x*) corresponding to the reduction value x*. The ALU computes a multiplication of the reduction value x* by the intermediate function f(x*) as the computation result of a trigonometric function.

12 Claims, 3 Drawing Sheets

(56) References Cited

OTHER PUBLICATIONS

Jose-Alejandro Pineiro, High-Speed Function Approximation Using a Minimax Quadratic Interpolator, Mar. 2005, IEEE Transactions on Computers, vol. 54, No. 3, section 3.*
Samuel Gal, et al., An Accurate Elementary Mathematical Library for IEEE Floating Point Standard, ACM Transactions on Mathematical Software, vol. 17, No. 1, Mar. 1991 pp. 26-45.*
European Search Report dated Feb. 6, 2017, issued in application No. 15190840.7-1870.
Nickolls, J., et al.; "Appendix C: Graphics and Computing GPUs;" Jan. 1, 2013; pp. 1-76.
Fanucci, L., et al.; "A sine wave digital synthesizer based on a quadratic approximation;" 2001 IEEE International Frequency Control Symposium and PDA Exhibition; Jun. 6, 2011; pp. 806-810.
Harrision, J., et al.; "Formal Verification of Floating Point Trigonometric Functions;" Nov. 1, 2000; pp. 217-233.
Abramowitz, M., et al.; "Handbook of Mathematical Functions—Circular Functions;" United States Department of Commerce; National Bureau of Standards; Series 55; Jan. 1, 1972; pp. 70-79.

* cited by examiner

US 10,353,672 B2

METHODS AND APPARATUSES FOR COMPUTING TRIGONOMETRIC FUNCTIONS WITH HIGH PRECISION

CROSS REFERENCE TO RELATED APPLICATIONS

This application claims the benefit of China Patent Application No. 201510621326.0, filed on Sep. 25, 2015, the entirety of which is incorporated by reference herein.

BACKGROUND

Technical Field

The present invention relates to 3D (three-dimensional) graphics processing, and in particular, it relates to methods and apparatuses for computing trigonometric functions with high precision.

Description of the Related Art

Trigonometric functions are included in all 3D (three-dimensional) graphics APIs (Application Programming Interfaces), such as DirectX and OpenGL. In order to satisfy the performance requirements of 3D graphics under certain constraints, GPUs (Graphics Processing Units) take specific hardware logic units called SFUs (Special Function Units) to compute trigonometric functions and other transcendental functions. 3D graphics API only require the maximum absolute error being 0.0008 in the interval from −100*Pi to +100*Pi for trigonometric functions, which can be achieved by SFUs. However, the traditional SFU computing methods cannot meet higher precision requirements of GPGPU (General-Purpose computing on Graphics Processing Unit) for trigonometry functions. Thus, methods and apparatuses for computing trigonometric functions are introduced to achieve the precision requirements of GPGPU.

BRIEF SUMMARY

An embodiment of a method for computing trigonometric functions, performed by an ALU (Arithmetic Logic Unit) in coordination with an SFU (Special Function Unit), is introduced to contain at least the following steps. The ALU computes a remainder r and a reduction value x* corresponding to an input parameter x. The SFU computes an intermediate function f(x*) corresponding to the reduction value x*. The ALU computes a multiplication of the reduction value x* by the intermediate function f(x*) as the computation result of a trigonometric function.

An embodiment of an apparatus for computing trigonometric functions at least contains an ALU and an SFU. The SFU is coupled to the ALU. The ALU computes a remainder r and a reduction value x* corresponding to an input parameter x. The SFU computes an intermediate function f(x*) corresponding to the reduction value x*. The ALU computes a multiplication of the reduction value x* by the intermediate function f(x*) as the computation result of a trigonometric function.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It should be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
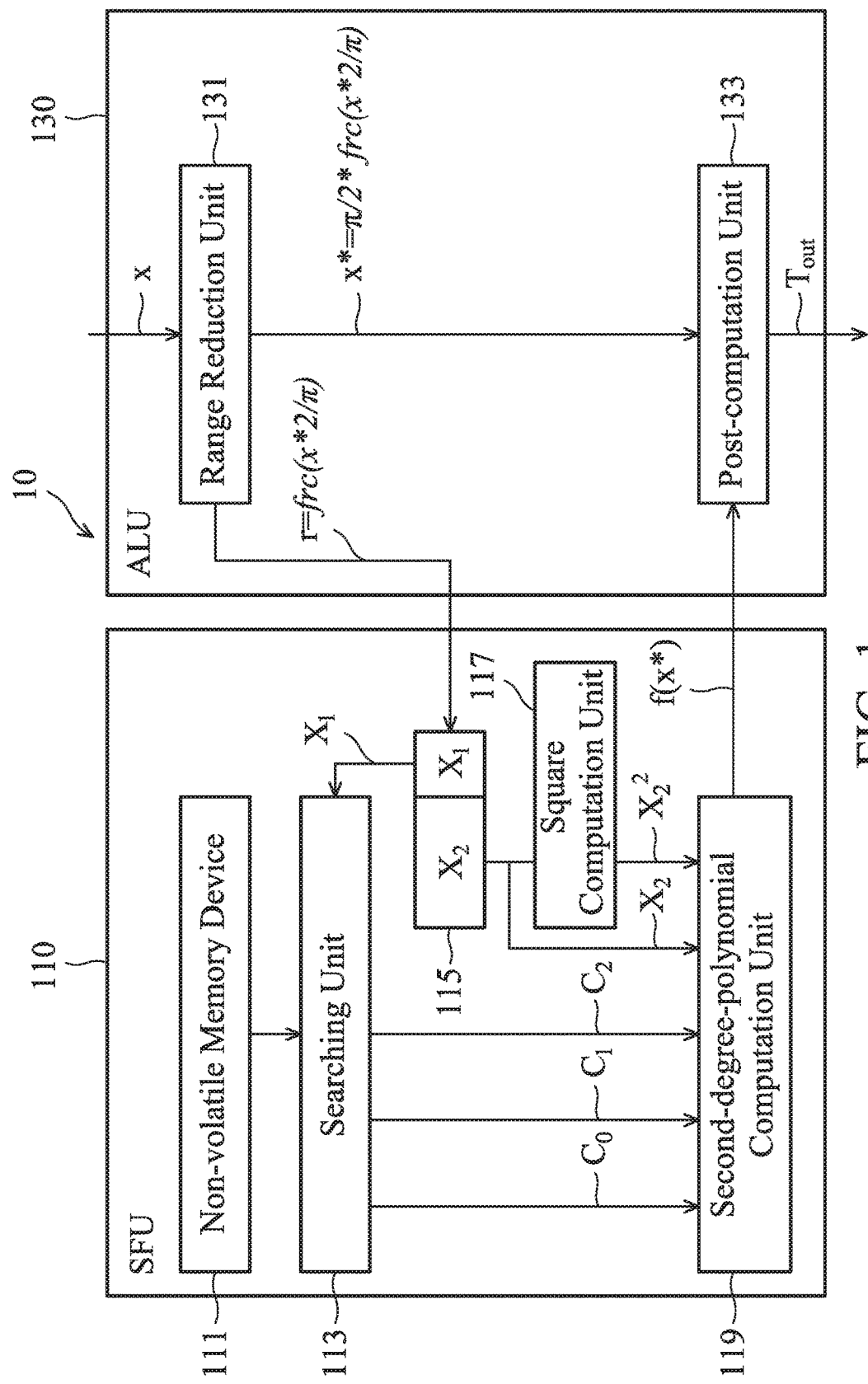
FIG. 1 is the hardware architecture of the apparatus for computing trigonometric functions according to an embodiment of the invention.

In general, a GPU (Graphics Processing Unit) contains an ALU (Arithmetic Logic Unit) to coordinate with an SFU (Special Function Unit) to complete computation of the trigonometric functions. In some implementations, the ALU may use the SFU in 32 bits to compute sin(x*) or cos(x*) directly, where x* ranges between 0 and $2/\pi$. However, the computation results cannot meet the precision (<=4ULP, Unit of Least Precision) required by the GPGPU. Embodiments of the invention introduce the hardware architecture for generating results of trigonometric functions, which meet the precision required by the GPGPU. FIG. 1 is the hardware architecture of the apparatus for computing trigonometric functions according to an embodiment of the invention. The apparatus 10 at least contains the SFU 110 and the ALU 130. The ALU 130 directs the SFU 110 to compute the intermediate function f(x*), multiplies the computation results by the SFU 110 by x* and outputs f(x*)·x* as the outcome of sin(x) or cos(x). The intermediate function f(x*) is the magnitude sin(x*)/x* or cos(x*)/x* using the minimax quadratic approximation.

The SFU 110 contains the non-volatile memory device 111 storing the LUT (Look-Up Table) corresponding to the intermediate function f(x*). The non-volatile memory device 111 may be a ROM (Read-Only Memory), an EPROM (Erasable Programmable Read Only Memory), an SRAM (Static Random Access Memory) or others. The LUT contains 128 ($2^7$) entries each storing the coefficients $C_0$, $C_1$ and $C_2$ of the second-degree polynomial corresponding to one of binary values from "0b0000000" to "0b1111111". For example, the record corresponding to the binary value "0b0000000" contains $C_0$=0xffff96b, $C_1$=0xd28c and $C_2$=0x1a51. The record corresponding to the binary value "0b0000010" contains $C_0$=0xfff5b83, $C_1$=0x41ca8 and $C_2$=0x1a4f. The record corresponding to the binary value "0b1111111" contains $C_0$=0xa39c56b, $C_1$=0xa2ace4 and $C_2$=0x9a2.

The range reduction unit 131 computes a remainder r for an input parameter x and stores the remainder in the volatile memory device 115 of the SFU 110. Specifically, a remainder may be computed by the Equation:

$$r = frc(x*2/\pi) \quad (1)$$

Where r ranges between 0 and 1. Subsequently, it is determined whether a host requests for computing sin(x) or cos(x) according to an input opcode. If the host requests that cos(x) be computed, the remainder may be further adjusted by the Equation:

$$r = 1.0 - r \quad (2)$$

Next, a reduction value x* may be computed by the Equation:

$$x^* = \pi/2 * r \quad (3)$$

The volatile memory device 115 may be a register, a FIFO (First-In-First-Out) buffer, or others. The remainder r of the volatile memory device 115 is divided into two parts: a magnitude $X_1$ (bit30 to bit24) and a magnitude $X_2$ (bit23 to bit0). The searching unit 113 finds the associated record from the non-volatile memory device 111 according to the magnitude $X_1$ of the volatile memory device 115 as an index and outputs the coefficients $C_0$, $C_1$ and $C_2$ of the found record to the second-degree-polynomial computation unit 119. The square computation unit 117 reads the magnitude $X_2$ of the volatile memory device 115, computes the square of $X_2$ and outputs the computation results to the second-degree-polynomial computation unit 119. The second-degree-polynomial computation unit 119 computes the intermediate function f(x*) according to the coefficients $C_0$, $C_1$ and $C_2$, the magnitude $X_2$ and the square of $X_2$. The intermediate function f(x*) may be computed by the Equation:

$$f(x^*) = C_0 + C_1 * X_2 + C_2 * X_2^2 \quad (4)$$

The second-degree-polynomial computation unit 119 further outputs the computation results to the post-computation unit 133 of the ALU 130. It should be noted that, compared with the coefficients $C_0$, $C_1$ and $C_2$ represented by numerical range in 6 bits or less, the coefficients $C_0$, $C_1$ and $C_2$ represented by numerical range in 7 bits, which are stored in the LUT, have higher precision. The intermediate function f(x*) may be treated as the outcomes of Sin(x*)/x* or Cos(x*)/x*. The post-computation unit 133 may compute a trigonometric function $T_{out}$ by the Equation:

$$T_{out} = f(x^*) * x^* \quad (5)$$

The computation result $T_{out}$ is sin(x*) if the input opcode indicates that the host requests for computing sin(x). The computation result $T_{out}$ is cos(x*) if the input opcode indicates that the host requests that cos(x) be computed.

Figure 2:
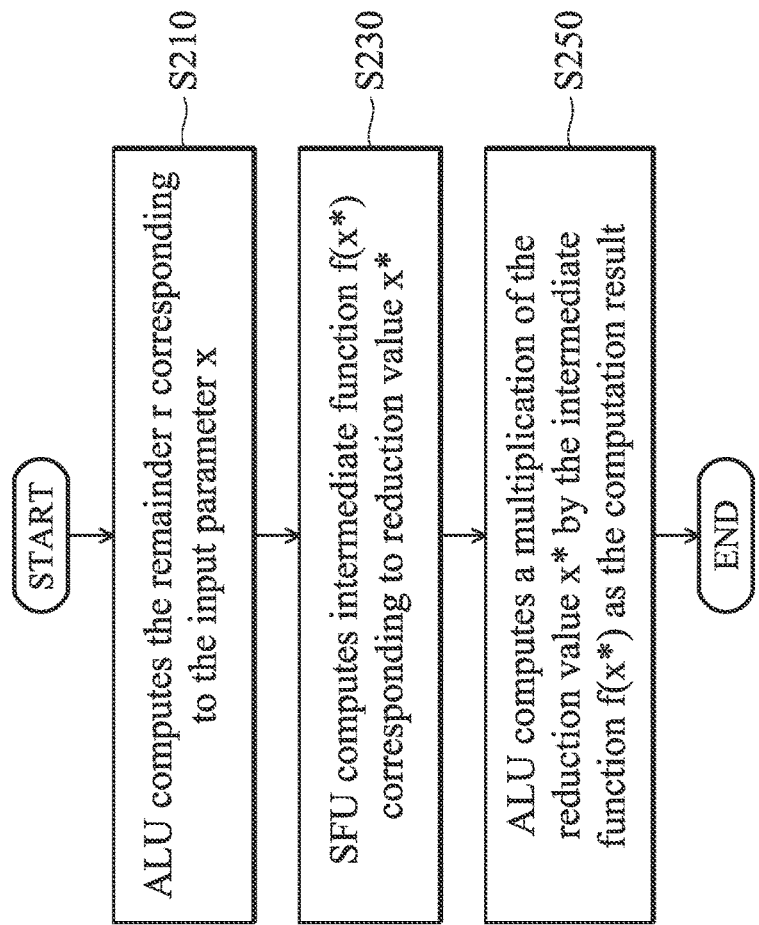
FIG. 2 is a flowchart illustrating the method for computing trigonometric functions according to an embodiment of the invention.

FIG. 2 is a flowchart illustrating the method for computing trigonometric functions according to an embodiment of the invention. The method is completed by the ALU 130 in coordination with the SFU 110. After receiving a trigonometric-function request from a host, the ALU 130 computes the remainder r corresponding to the input parameter x and sends the remainder r to the SFU 110 (step S210). Subsequently, the SFU 110 computes the intermediate function f(x*) corresponding to a reduction value x* and sends the intermediate function f(x*) to the ALU 130 (step S230). Subsequently, the ALU 130 computes the multiplication of the reduction value x* by the intermediate function f(x*) as the computation result and replies with the computation result to the host (step S250).

Figure 3:
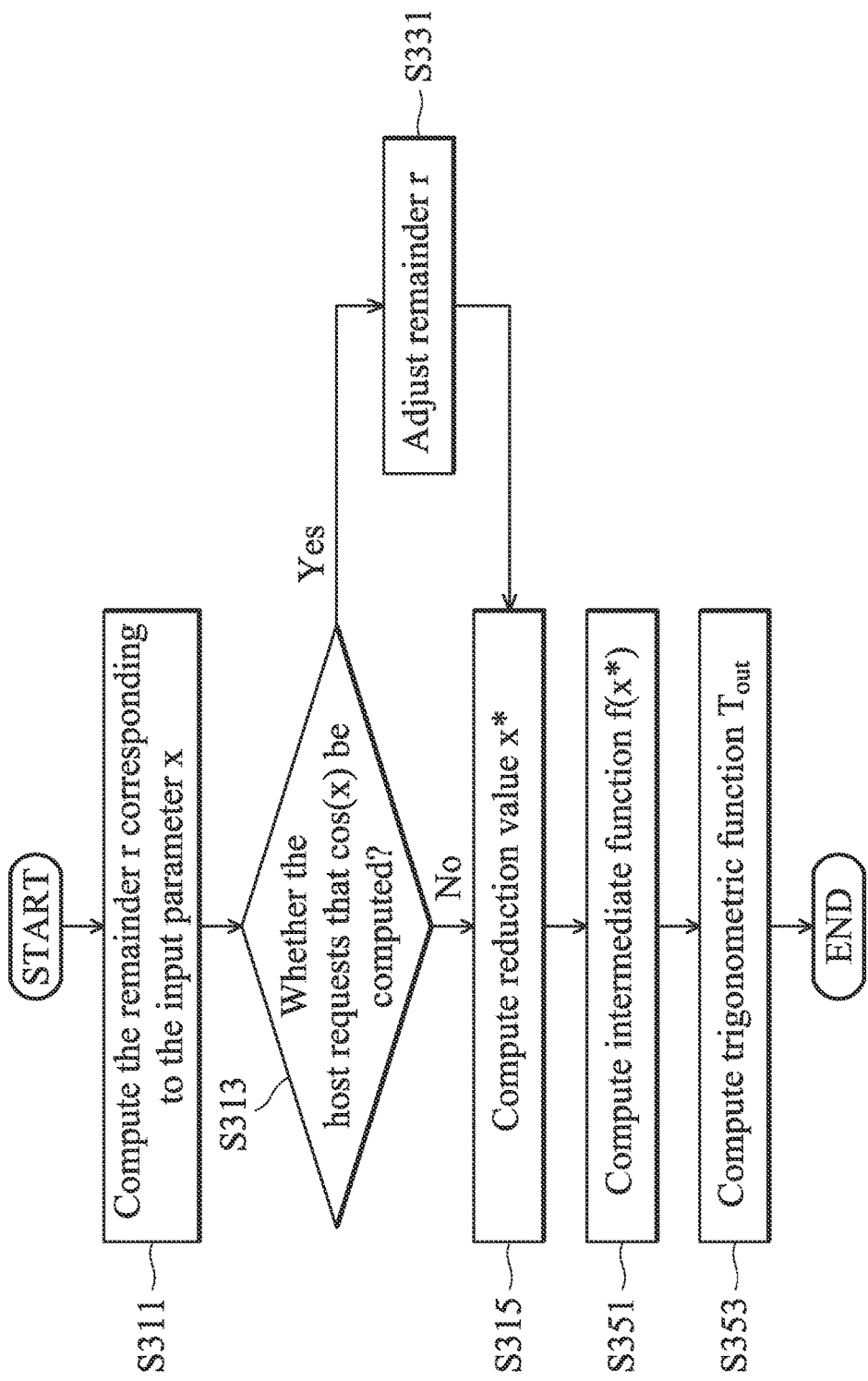
FIG. 3 is a flowchart illustrating the method for computing trigonometric functions according to an embodiment of the invention.

FIG. 3 is a flowchart illustrating the method for computing trigonometric functions according to an embodiment of the invention. After receiving a trigonometric-function request from a host, the range reduction unit 131 computes the remainder r corresponding to the input parameter x using the Equation (1) (step S311). Subsequently, the range reduction unit 131 determines whether the host requests that cos(x) be computed (step S313). If so, the range reduction unit 131 adjusts the remainder r using the Equation (2) (step S331) and computes a reduction value x* using the Equation (3) (step S315). Otherwise, the range reduction unit 131 computes a reduction value x* using the Equation (3) directly (step S315). Subsequently, the ALU 130 directs the SFU 110 to compute an intermediate function f(x*) (step S351). In step S351, specifically, the range reduction unit 131 stores the remainder r in the volatile memory device 115 of the SFU 110. The searching unit 113 finds the associated record from the non-volatile memory device 111 according to the magnitude $X_1$ of the volatile memory device 115 as an index and outputs the coefficients $C_0$, $C_1$ and $C_2$ of the found record to the second-degree-polynomial computation unit 119. The square computation unit 117 reads the magnitude $X_2$ of the volatile memory device 115, computes the square of $X_2$ and outputs the computation results to the second-degree-polynomial computation unit 119. The second-degree-polynomial computation unit 119 computes the intermediate function f(x*) according to the coefficients $C_0$, $C_1$ and $C_2$, the magnitude $X_2$ and the square of $X_2$ using the Equation (4) and sends the computation results to the post-computation unit 133. Finally, the post-computation unit 133 computes a trigonometric function $T_{out}$ by the Equation (5) and replies with the computation result to the host (step S353). The computation result $T_{out}$ is sin(x*) if the input opcode indicates that the host requests for computing sin(x). The computation result $T_{out}$ is cos(x*) if the input opcode indicates that the host requests that cos(x) be computed.

Although the embodiments have been described in FIG. 1 as having specific elements, it should be noted that additional elements may be included to achieve better performance without departing from the spirit of the invention. While the process flows described in FIGS. 2 and 3 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method implemented by a GPU (Graphics Processing Unit) for computing trigonometric functions in three-dimensional graphics Application Programming Interfaces (APIs), comprising:

computing, by a range reduction unit of an ALU (Arithmetic Logic Unit), a remainder r and a reduction value $x^*$ corresponding to an input parameter x;

communicating the remainder r to an SFU (Special Function Unit);

computing, by the SFU, an intermediate function $f(x^*)$ corresponding to the reduction value $x^*$;

communicating the intermediate function $f(x^*)$ to the ALU; and computing, by a post-computation unit of the ALU, a multiplication of the reduction value $x^*$ by the intermediate function $f(x^*)$ as a computation result of a trigonometric function, wherein the reduction value $x^*$ is computed by an Equation:

$$x^*=\pi/2*frc(x*2/\pi).$$

2. The method of claim 1, wherein the step for computing, by a range reduction unit of an ALU (Arithmetic Logic Unit), a remainder r and a reduction value $x^*$ corresponding to an input parameter x, further comprises:

computing the remainder r corresponding to the input parameter x using an Equation:

$$r=frc(x*2/\pi);$$

determining whether a host requests that cos(x) be computed;

when the host requests that cos(x) be computed, adjusting the remainder r using an Equation:

$$r=1.0-r; \text{ and}$$

computing the reduction value $x^*$ using an Equation:

$$x^*=\pi/2*r.$$

3. The method of claim 1, wherein the step for computing, by an SFU (Special Function Unit), an intermediate function $f(x^*)$ corresponding to the reduction value $x^*$, further comprises:

obtaining coefficients $C_0$, $C_1$ and $C_2$ of a second-degree polynomial from a LUT (Look-Up Table) according to a first magnitude $X_1$ of the remainder r as an index;

obtaining a second magnitude $X_2$ of the remainder r; and computing the intermediate function $f(x^*)$ using an Equation:

$$f(x^*)=C_0+C_1*X_2+C_2*X_2^2.$$

4. The method of claim 3, wherein the intermediate function $f(x^*)$ is a result of $Sin(x^*)/x^*$ or $Cos(x^*)/x^*$.

5. The method of claim 3, wherein the first magnitude $X_1$ is 7 bits and the second magnitude $X_2$ is 24 bits.

6. The method of claim 5, wherein the LUT comprises 128 records and each record stores the coefficients $C_0$, $C_1$ and $C_2$ of the second-degree polynomial associated with one of binary values from "0b0000000" to "0b1111111".

7. An apparatus in a GPU (Graphics Processing Unit) for computing trigonometric functions in three-dimensional graphics Application Programming Interfaces (APIs), comprising:

an ALU (Arithmetic Logic Unit); and an SFU (Special Function Unit), coupled to the ALU, wherein the ALU includes range reduction circuitry configured to compute a remainder r and a reduction value $x^*$ corresponding to an input parameter x; the SFU includes second-degree-polynomial computation circuitry configured to compute an intermediate function $f(x^*)$ corresponding to the reduction value $x^*$; and the ALU includes post-computation circuitry configured to compute a multiplication of the reduction value $x^*$ by the intermediate function $f(x^*)$ as a computation result of a trigonometric function, wherein the reduction value $x^*$ is computed by an Equation:

$$x^*=\pi/2*frc(x*2/\pi).$$

8. The apparatus of claim 7, wherein the ALU is configured to compute the remainder r corresponding to the input parameter x using an Equation: $r=frc(x*2/\pi)$; determines whether a host requests that cos(x) be computed; when the host requests that cos(x) be computed, adjusts the remainder r using an Equation: $r=1.0-r$; and computes the reduction value $x^*$ using an Equation: $x^*=\pi/2*r$.

9. The apparatus of claim 8, wherein the SFU further comprises:

a volatile memory device, coupled to the ALU, storing the remainder r;

a non-volatile memory device, storing a LUT (Look-Up Table); and wherein the SFU obtains coefficients $C_0$, $C_1$ and $C_2$ of a second-degree polynomial from the LUT according to a first magnitude $X_1$ of the remainder r as an index; obtains the coefficients $C_0$, $C_1$ and $C_2$ of the second-degree polynomial; obtains a second magnitude $X_2$ of the remainder r from the volatile memory device; obtains a square of the second magnitude $X_2$ from the square computation unit; and computes the intermediate function $f(x^*)$ using an Equation: $f(x^*)=C_0+C_1*X_2+C_2*X_2^2$.

10. The apparatus of claim 9, wherein the intermediate function $f(x^*)$ is a result of $Sin(x^*)/x^*$ or $Cos(x^*)/x^*$.

11. The apparatus of claim 9, wherein the first magnitude $X_1$ is 7 bits and the second magnitude $X_2$ is 24 bits.

12. The apparatus of claim 11, wherein the LUT comprises 128 records and each record stores the coefficients $C_0$, $C_1$ and $C_2$ of the second-degree polynomial associated with one of binary values from "0b0000000" to "0b1111111".

* * * * *